Sept. 13, 1927.  A. D. LANTZ  1,642,304
POULTRY WATERER
Filed Feb. 14, 1927  2 Sheets-Sheet 1

INVENTOR
A.D. Lantz,
BY
ATTORNEY.

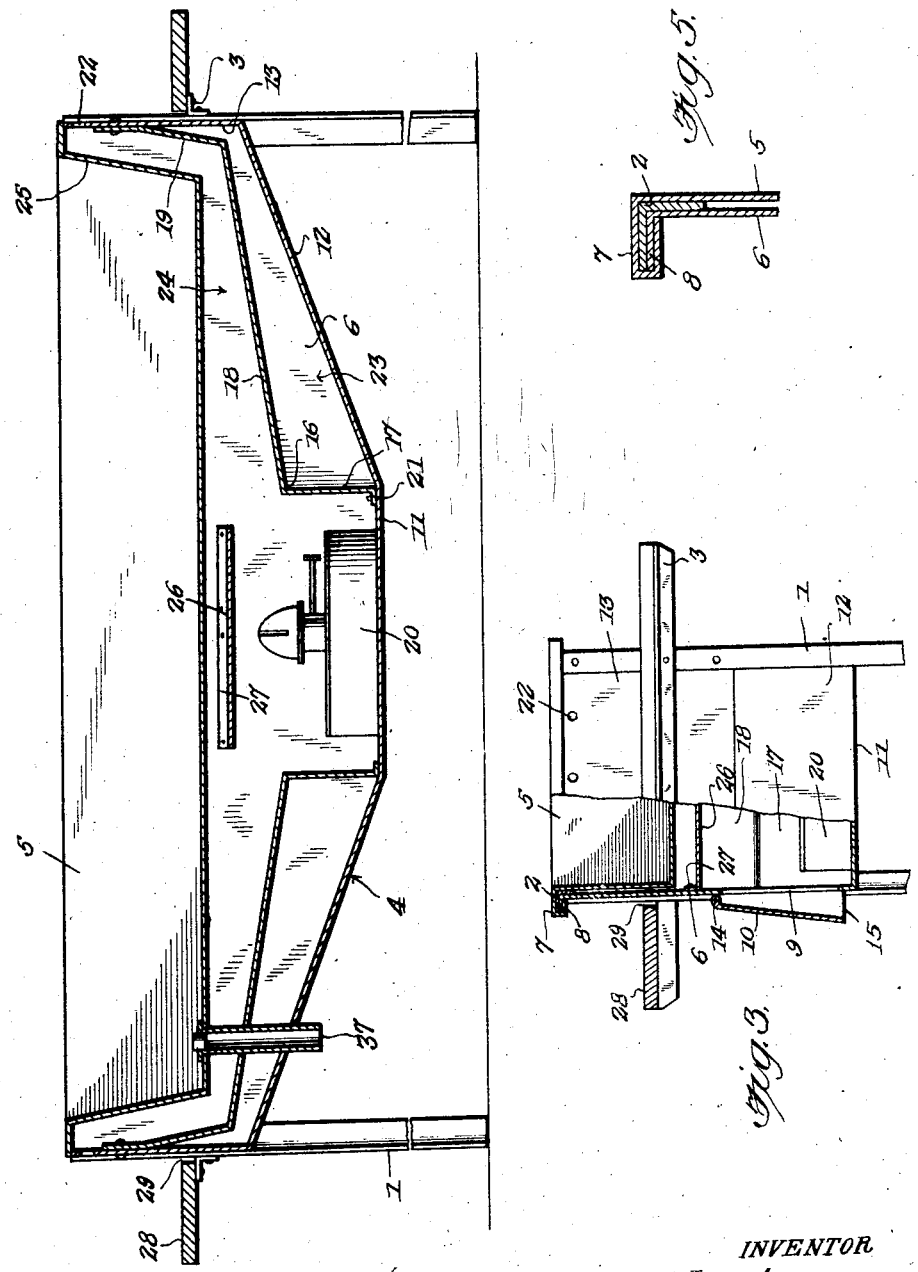

Patented Sept. 13, 1927.

1,642,304

UNITED STATES PATENT OFFICE.

ALPHA D. LANTZ, OF SIDNEY, OHIO, ASSIGNOR OF ONE-HALF TO LESLIE HELMAN, OF SIDNEY, OHIO.

POULTRY WATERER.

Application filed February 14, 1927. Serial No. 168,221.

The invention relates to a poultry waterer.

The object of the present invention is to improve the construction of poultry waterers and to provide a simple, practical and efficient poultry waterer of strong, durable and comparatively inexpensive construction equipped with means for maintaining the temperature of the water above freezing and adapted to prevent fowls from entering the tank whereby the poultry waterer is maintained in a sanitary condition.

A further object of the invention is to provide a poultry waterer of this character adapted to utilize all the heat of a kerosene or other lamp and capable of reducing to a minimum loss of heat by radiation by the poultry waterer and adapted to uniformly distribute the heat to the water tank so that all portions of the tank and the water will be maintained at the same temperature.

It is also an object of the invention to provide a poultry waterer having a platform forming a perch arranged to permit the fowls to stand in a convenient position with relation to the water tank while drinking and adapted to permit the major portion of the drip to escape between the casing and the perch whereby the latter will be maintained in a comparatively dry condition.

Another object of the invention is to arrange the cold air inlet a maximum distance from the vents for the escape of heated air and to provide a heat distributing element interposed between the lamp and the bottom of the tank to prevent the heat from radiating directly upward through the water at a point above the flame of the lamp which would have a tendency to keep the water much warmer at the center of the tank than would be desirable and at the same time prevent the water at the end portions of the tank from being maintained at the desired temperature.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Fig. 2 is a longitudinal sectional view of the same.

Fig. 3 is an end elevation partly in section.

Fig. 5 is an enlarged detail sectional view illustrating the manner of securing the sides of the tank and the sides of the outer shell or casing to the longitudinal angle bars of the frame.

Figure 1:
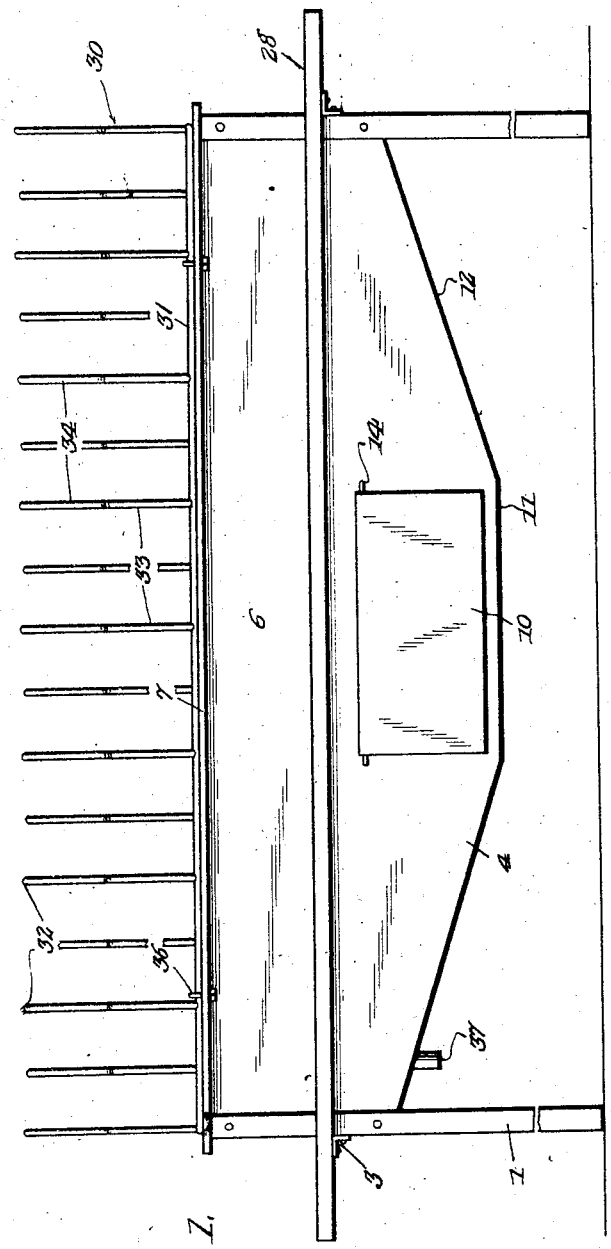
Figure 1 is a side elevation of a poultry waterer constructed in accordance with this invention.
Figure 4:
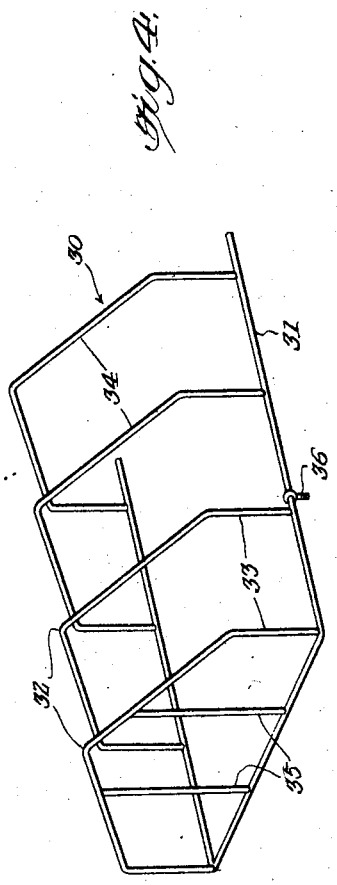
Fig. 4 is a perspective view of a portion of the hinged wire skeleton frame.

In the accompanying drawing in which is illustrated the preferred embodiment of the invention, the poultry waterer is provided with a frame comprising vertical legs 1 of angle iron connected at their upper ends by longitudinal side bars 2 and at a point below the same by transverse end bars 3 secured by bolts or other suitable fastening devices to the legs. The side bars 2 which have vertical and horizontal flanges support the outer shell or casing 4 and a tank 5 which contains the drinking water for the fowls. The side bars 2 have their horizontal flanges extending outwardly and the casing 4 is provided with vertical sides 6 which have their upper edges bent outwardly to form approximately U-shaped flanges 7 which are bent around the horizontal flanges of the side bars 2 and the tank 5 is also provided at its sides with outwardly extending laterally projecting approximately U-shaped flanges 8 which are bent around the horizontal flanges of the side bars 2. The flanges of the sides of the shell or casing are clinched between the flanges of the side bars and the flanges of the tank. By this arrangement the tank and the outer casing are securely fastened to the supporting frame but bolts or any other suitable fastening means may supplement the fastening of the side flanges of the tank and the casing to the frame if desired. The sides 6 of the outer casing have tapered lower portions and lower and centrally arranged horizontal edges and one of the sides is provided with an opening 9 for a door 10 and the said outer casing has a bottom 11 consisting of a central horizontal portion and inclined portions 12 which extend upwardly and outwardly to vertical end walls 13. The bottom and end walls are preferably formed of a single continuous piece, but the outer shell or casing may be of any suitable construction as will be readily understood. The door 10 is hinged at the top by a horizontal pintle 14 which has its ends bent inwardly and piercing the side of the outer casing at points beyond the opening 9 and clinching against the inner face of the outer casing. The top and side edges of the door 10 fit against the outer face of the adjacent side of the outer casing when the door is closed and the said door is bowed outwardly between its end edges to form a cold air inlet 15 at the bottom. The bowed portion inclines upwardly and inwardly as clearly shown in Fig. 3 of the drawings and the cold air is admitted at the bottom of the outer casing centrally of one side thereof.

The tank and the outer casing are oblong and the outer casing is provided at opposite sides of the opening 9 with partitions 16 consisting of inner vertical portions 17, inclined intermediate portions 18 and inclined outer portions 19. The vertical inner portions 17 are located at opposite sides of the door or opening and provide an intervening space for the reception of a lamp 20 which is introduced into the said space through the opening 9 when the door is open. The lower edge of the vertical portion 17 is provided with an attaching flange 21 which is riveted or otherwise secured to the bottom of the outer shell. The intermediate inclined portions 18 of the partitions extend upwardly and outwardly approximately midway between the tank and the inclined end portions of the bottom and the outer inclined portions 19 extend upwardly and outwardly above the bottom of the tank to outlet openings 22 provided in the end walls 13 of the outer casing near the top thereof for the escape of heated air whereby a circulation through the intervening space between the partitions and the tank is produced. The partitions form dead air spaces 23 which are located at the bottom and outer sides of the passages 24 formed by the partitions and the bottom and end walls of the tank for the passage of the heated air. The dead air spaces 23 form insulation and prevent loss of heat by radiation of the same from the bottom of the outer casing.

The tank which is permanently secured to the supporting frame is suspended within the outer casing and is moreover of one piece or one compartment tank so that the water may be uniformly heated and will have a free circulation throughout the entire area of the tank without partitions or other obstructions interfering with a free distribution of the heat and circulation of the water in the tank. The bottom of the tank is horizontal and the sides are vertical and are spaced slightly from the side walls of the casing as clearly illustrated in Fig. 3 of the drawing. The end walls 25 of the tank are inclined and are arranged in substantially parallelism with the inclined end portions of the partitions 16. The lamp is shown in the form of a lamp of the kerosene type and is designed to be used without a chimney and in order to prevent the central portion of the bottom of the tank being heated to a higher temperature a heat distributor 26 is provided. The heat distributor consists of a horizontal plate of sheet metal arranged in spaced relation with the bottom of the tank and extending entirely across the outer casing and having opposite attaching flanges 27 which are riveted or otherwise secured to the inner faces of the side walls of the outer casing. The heat distributor forms an intervening space between it and the bottom of the tank and it extends vertically over the entire lamp receiving space as clearly shown in Fig. 2 of the drawings. By this construction the heat is uniformly distributed to the end portions of the tank and by employing a tank of greater length and width an even distribution of the heat may be obtained by means of the heat distributor. This will prevent the water at the center of the tank from being too high a temperature at the expense of the water of the end portions of the tank and the latter will be maintained at a proper temperature. Any type of lamp may be employed and a plurality of lamps may be used if desired. The legs of the frame are of sufficient length to elevate the casing above the floor a distance which will prevent any liability of trash on the floor coming in contact with the flame of the lamp when the door is opened for adjusting the lamp or otherwise attending to the same.

The end bars 3 are provided with outwardly extending horizontal flanges and they support a platform 28 forming a perch and extending entirely around the poultry waterer and arranged at a convenient distance below the upper edges of the tank to permit the fowls to stand within easy reach of the water while drinking. In order to maintain the perch in a practically dry condition the inner edges of the platform is spaced from the side and end walls of the outer casing to provide an intervening drip space 29 which permits the major portion of the drip to drain below the platform without accumulating thereon. In practice a space of approximately two inches will be provided before draining off the drip. The platform is oblong and may be of any desired construction and it is bolted or otherwise secured to the transverse end bars 3 which project laterally beyond the lugs and terminate adjacent to the outer edges of the side portions of the perch.

In order to keep fowls out of the tank and thereby maintain the poultry waterer in a sanitary condition, the poultry waterer is equipped with a skeleton wire frame 30 forming a protecting cage over the tank and comprising a horizontal bottom rectangular frame member 31 and transversely disposed arched members 32 composed of vertical end portions 33 and oppositely inclined upper portions 34. The transverse arched members 34 are arranged in parallelism and are secured by welding or other suitable means to the horizontal oblong frame member 31 and the end arches are supported at intermediate points by vertical frame members 35 which also divide the space at the ends of the cage and prevent fowls from entering the tank at the ends thereof. The rectangular bottom frame member is secured upon the upper edges of the tank by eye bolts 36 or other suitable means which receive one side of the bottom frame member 31 and form hinges for permitting the cage to be readily swung upwardly and outwardly from over the tank to afford access to the latter for the purpose of cleaning the same. The tank is provided with a drain pipe 37 which extends through the bottom of the outer casing and through the adjacent partition 16 and projects below the outer casing. The drain pipe may be provided with any suitable closure for confining the water within the tank and the tank is adapted to be readily cleaned without removing it from the outer casing. The device may, if desired, be provided for positively preventing the cage from being swung from over the tank, but as the cage is designed to be constructed of heavy galvanized wire it will have sufficient weight to maintain itself in operative position. It would seem that practically the entire heat of the lamp is utilized and that by providing the cold air inlet at the bottom of the door and the warm air vents at the ends of the tank that the tank is uniformly heated from one end to the other.

What is claimed is:

1. A poultry waterer including an outer casing provided at one side with a door or opening, a door hinged at the top to the outer casing at the said opening and having an outwardly offset lower portion forming a cold air inlet at the bottom of the door, said outlet casing being provided at opposite ends with warm air vents located adjacent the top of the poultry waterer, and opposite partitions extending across the end portions of the outer casing and composed of inner upwardly extending portions, outwardly extending intermediate portions and upwardly extending outer portions, said partitions being spaced from the bottom of the outer casing and extending to points adjacent the warm air vents, and a tank suspended within the outer casing and arranged in spaced relation with the partitions, the latter forming passages for the circulation of heated air and providing dead air spaces for insulation.

2. A poultry waterer including an oblong outer casing having inclined bottom portions located at opposite sides of the center, one side of the outer casing being provided with a door or opening, a tank suspended within the outer casing and entirely closing the top thereof, said outer casing being provided at its ends with warm air vents, partitions arranged at opposite sides of the door or opening and composed of inner vertical portions, inclined intermediate portions and upwardly extending inclined outer portions, said partitions forming dead air spaces and spaced from the tank to provide passages for the circulation of heated air.

3. A poultry waterer comprising an oblong outer casing provided at one side with a door or opening and having warm air vents at the upper portions of the end walls, a tank suspended within the outer casing, partitions extending entirely across the outer casing and spaced apart at the door opening to provide a lamp space and extending to points adjacent the warm air vents, said partitions being spaced from the bottom of the outer casing and from the tank to provide dead air insulating spaces and passages for the circulation of heated air, and a heat distributor consisting of a sheet of metal extending across the lamp receiving space and arranged in spaced relation with the bottom of the tank at the central portion thereof.

In testimony whereof I affix my signature.

ALPHA D. LANTZ.